June 22, 1965  M. I. FILLWEBER  3,190,085
COUPLING CONSTRUCTION

Filed Feb. 20, 1963  2 Sheets-Sheet 1

INVENTOR.
MARCELLUS I. FILLWEBER

BY

ATTORNEYS

June 22, 1965    M. I. FILLWEBER    3,190,085
COUPLING CONSTRUCTION
Filed Feb. 20, 1963    2 Sheets-Sheet 2
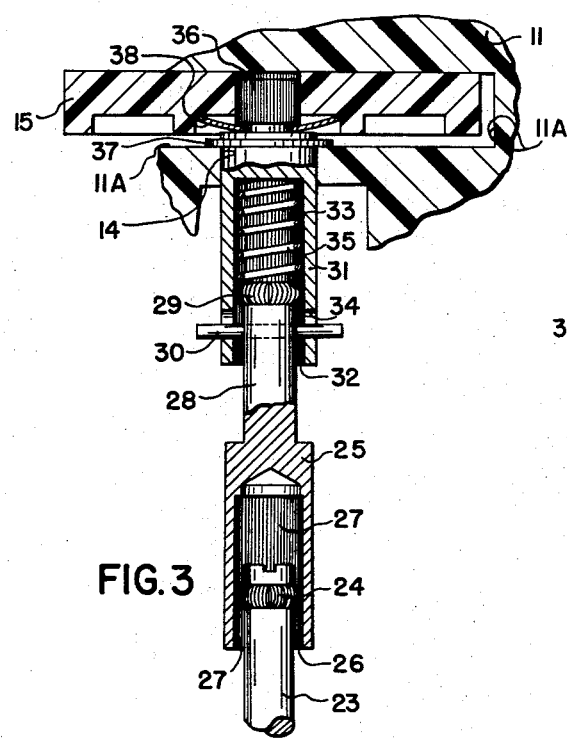
FIG. 3
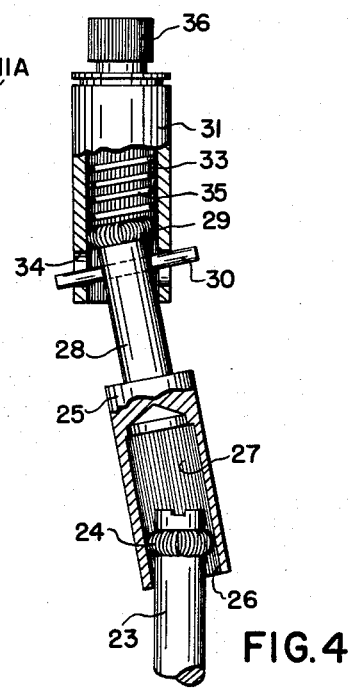
FIG. 4
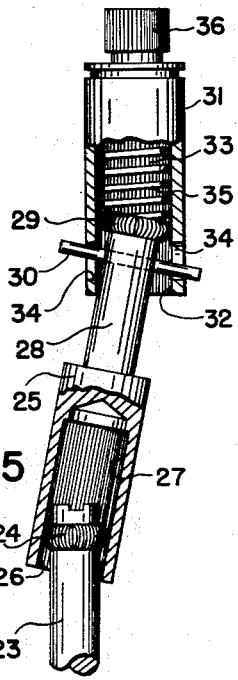
FIG. 5
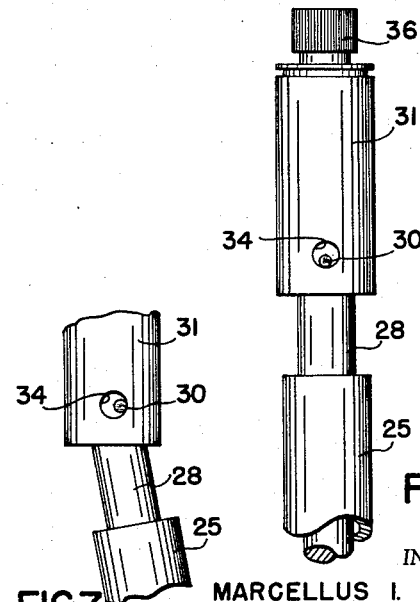
FIG. 6
FIG. 7
INVENTOR.
MARCELLUS I. FILLWEBER
BY
ATTORNEYS

United States Patent Office 3,190,085
Patented June 22, 1965

3,190,085
COUPLING CONSTRUCTION
Marcellus I. Fillweber, Mansfield, Ohio, assignor to Dominion Electric Corporation, a corporation of Ohio
Filed Feb. 20, 1963, Ser. No. 259,968
3 Claims. (Cl. 64—8)

My invention relates to coupling constructions for interconnecting rotatable shafts.

An object of my invention is to provide an improved coupling mechanism which makes a driving connection between a first shaft rotatable on a first reference axis and a second shaft rotatable on a second reference axis notwithstanding any possible misalignment of the axes.

Another object is the provision for accommodating for any misalignment of shaft axes in a structure, such as an electric appliance, such misalignment occurring through lack of precision in fabricating and assembling such a structure.

Another object is the provision of means for facilitating the rapid and easy assembly of the operating mechanism for a device, such as an electric appliance.

In the fabrication and assembly of a structure, such as an electric sad iron, it is found that the axis of a rotatable portion of a device to be actuated, such as a thermostat, is not always in precise alignment with the axis of an actuating member, such as a regulating dial, which is oriented according to an opening in the shell or handle portion of such a structure. In such cases, it is found that there has been difficulty in assembling the driving connection between the actuatable portion of such a device, such as a thermostat, and the shaft rotatable by the actuating member, such as a regulating dial. Unless the reference axes upon which the actuating member and the actuatable member rotate are in alignment, there is a tendency for binding and non-functioning because of the tendency to tilt or cock the shaft intermediate the actuatable portion of the device, such as a thermostat, and the actuating member, such as a regulating dial.

An important object of this invention is to obviate the difficulties and shortcomings of the prior devices and to facilitate the rapid and economical assembly of such devices, as for example, an electric sad iron, and to assure the efficient operation of the same.

Other objects and a fuller understanding of the invention may be had by referring to the following description and claims, taken in conjunction with the accompanying drawings, in which:

FIGURE 3 is an enlarged sectional view of my coupling construction with the axes of the parts shown in alignment;

FIGURE 4 is an enlarged sectional view of my coupling construction separated from the sad iron and showing the axes of the shafts in misalignment and the power-transmitting member therebetween tilted in one direction;

FIGURE 5 is an enlarged sectional view of my coupling construction showing the axes of the shafts in misalignment and the power-transmitting member therebetween tilted in an opposite direction from that shown in FIGURE 4;

FIGURE 6 is a side elevational view of a portion of my coupling construction with the axes of the parts in alignment as in FIGURE 3 but illustrating the parts rotated at 90° from their position shown in FIGURE 3; and FIGURE 7 is a partial view of the parts as shown in FIGURE 6 but illustrating the power-transmitting member tilted at an angle to the upper shaft.

Figure 1:
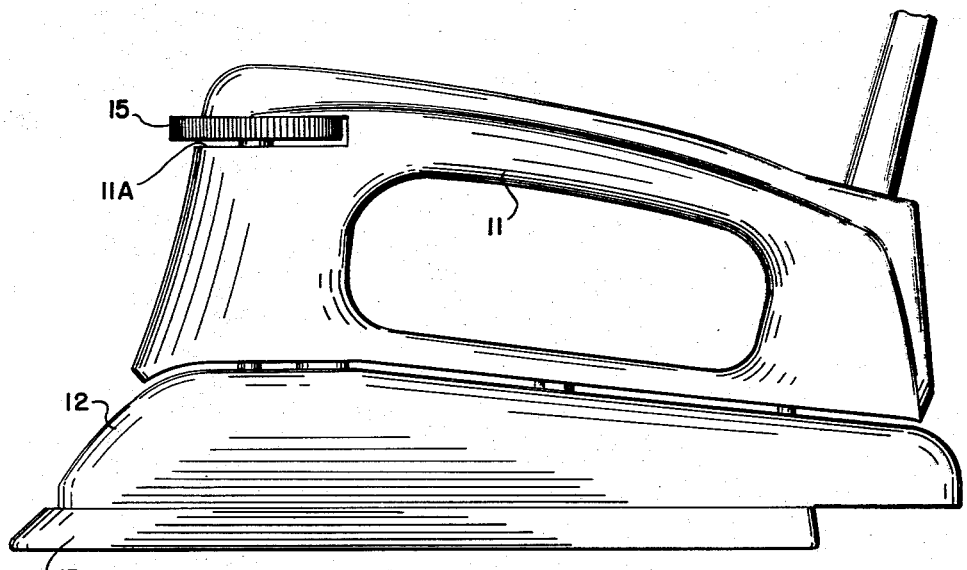
FIGURE 1 is a side elevational view of an electric sad iron embodying my invention.
Figure 2:
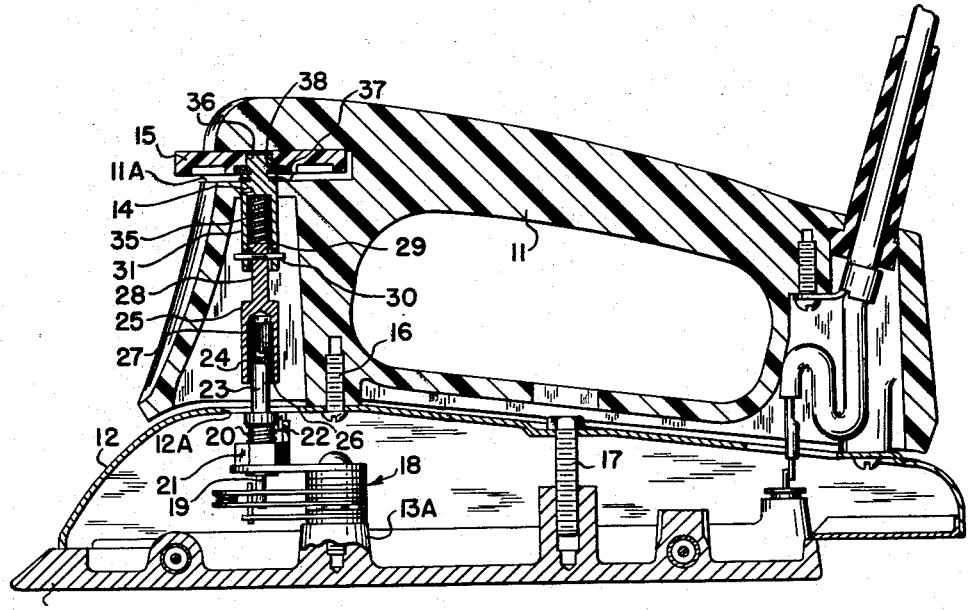
FIGURE 2 is a longitudinal sectional view through the electric sad iron shown in FIGURE 1 and illustrating the disposition of the coupling construction in the sad iron.

My invention finds one of its important uses in an electric sad iron for providing a driving connection between the rotatable spindle or actuatable portion of a thermostat and the regulating dial which is manually rotated to adjust the position and hence the temperature setting of the thermostat. The invention will be here described in the environment of its use in such an electric sad iron.

The electric sad iron to which the invention is shown applied by way of example has a handle portion 11 made of a plastic or other heat and electrical insulating material. An aluminum sole plate 13, which is heated by electrical heating elements mounted to the upper side of the sole plate, is disposed below the handle portion 11. A metal shell 12 is positioned over the sole plate 13 and houses within it the electrical heating element, a thermostat assembly 18, and other internal parts. A bolt 17 secures the metal shell 12 to the sole plate 13. A plurality of bolts 16 secure the plastic handle portion 11 in the usual manner to the shell 12.

Provided in a horizontally disposed transverse slot 11A of the handle portion 11 is a regulating dial 15 which is a disc of plastic or other suitable material rotatable on its axis. The operator using the sad iron may readily manually rotate the dial 15 so as to set the thermostat to the position desired.

The handle portion 11 has provided in it immediately below the slot 11A and in axial alignment with the dial 15 a round opening 14. Extending through the opening 14 is a first shaft 31, directed downwardly toward the sole plate. The first shaft 31 has a toothed or knurled head 36 which is in a tight press fit with the dial 15 so that rotation of the dial 15 simultaneously causes simultaneous rotation of the first shaft 31. A spring washer 38 around the first shaft 31 and beneath the dial 15 resiliently urges the dial 15 upwardly. A snap retainer ring 37 engages in an annular groove of the first shaft 31 and rests upon the lower surface of the slot 11A so as to hold the first shaft 31 in position. The axis of the round opening 14 is the same as the axis of the first shaft 31 by reason of the interfit therebetween. This common axis of the first shaft 31 and of the round opening 14 provided in the plastic handle portion 11 is referred to as a first reference axis. The location of this first reference axis is determined by the fabrication and degree of precision in the manufacture of the handle portion 11 and is also determined by the position of the handle portion 11 relative to the sole plate 13, which relative position is determined by the bolts 17 and 16 and the threaded openings accommodated therein. Thus the location of the said first reference axis relative to the sole plate 13 may vary because of variations in the fabrication and assembly of the parts.

The sole plate 13 is provided with a boss 13A which is part of the same aluminum casting of which the sole plate is made. Mounted upon the boss 13A is the thermostat assembly 18 of usual construction. The thermostat assembly 18 is bolted to the boss 13A in the usual manner. The location of the thermostat assembly 18 is thus dependent upon the location of the boss 13A and of the bolt which secures the assembly to the boss 13A.

The assembly includes a ceramic pin 19 which adjusts the relative positions of the bimetal leaves of the thermostat assembly 18. By the raising and lowering of the ceramic pin 19, the setting of the thermostat is determined. The raising and lowering of the ceramic pin 19, in turn, is accomplished by rotation of a threaded spindle 20 in a complementarily threaded sleeve 21 carried by the thermostat assembly 18. A stop 22 provides a limit to rotation of the spindle 20 to prevent its rotation beyond a predetermined degree.

A second shaft 23 is non-rotatively secured to the threaded spindle 20 so that rotation of the second shaft 23 causes simultaneous rotation of the threaded spindle 20. Hence axial movement of the ceramic pin 19 which adjusts the setting of the thermostat is obtained. The second shaft 23 extends upwardly through an opening 12A in the shell 12 toward the first shaft 31.

The axis of the second shaft 23, threaded spindle 20 and ceramic pin 19 is referred to as a second reference axis. The location of this second reference axis is determined by the structure of the sole plate 13, including the boss 13A, and the structure and dimension of the parts of the thermostat assembly 18. As these factors are variable because of lack of precision in the fabrication and assembly of the parts, the location of the second reference axis varies from one said iron to another and is not predictable with absolute certainty.

In the normal and desired structure and final assembly, the first reference axis, that is, the axis of the first shaft 31, is in precise alignment with the second reference axis, that is, the axis of the second shaft 23. However, for the reasons stated, it is not always possible to have the two reference axes in precise alignment. Without such precise alignment, a straight connection, such as a single shaft, between the dial 15 and the actuatable spindle 20 of the thermostat 18 would tend to bind or cock and be difficult to assemble in place.

In the form of the invention shown and described by way of illustration, there is provided an interconnecting or power-transmitting member 25. This member 25, as shown in the drawing, has a cylindrical bore or recess 26 having a downwardly directed opening. The upper end of the second shaft 23 is telescopically received within the cylindrical bore 26. The diameter of the second shaft 23 is somewhat smaller than the internal diameter of the bore 26 of the member 25. Mounted on and disposed adjacent the upper end of the second shaft 23 is a bulbous head 24. This bulbous head 24 has longitudinally extending serrations disposed therearound. The outer contour of the teeth formed by the serrations are arcuate or semi-spherical in form. Formed in the inner wall of the recess or bore 26 of the member 25 are longitudinally extending serrations 27 disposed therearound. The serrations 27 form teeth which surround the bulbous head 24 and which are enmeshed with the teeth of the bulbous head 24. By reason of the construction and interfit of the parts, axial movement between the parts 23 and 25 is permitted, rotation of one of these parts causes simultaneous rotation of the other part, and also the power-transmitting member 25 may tilt or cock relative to the second shaft 23, as illustrated, for example, in FIGURES 4 and 5.

The intermediate or power-transmitting member 25 has a stem portion 28 extending upwardly toward the first shaft 31. Mounted upon and disposed adjacent the upper end of the stem portion 28 of the member 25 is a bulbous head 29. This bulbous head 29, like the bulbous head 24, is longitudinally serrated to form gear teeth extending therearound. The outer contour of these teeth are arcuate or semi-spherical in form. The first shaft 31 has a cylindrical bore or recess 32 opening downwardly toward the member 25. The diameter of the stem 28 is somewhat smaller than the internal diameter of the cylindrical bore 32. The bulbous head 29 on the stem 28 is in a telescopic fit with the first shaft 31 so that one part may move in an axial direction relative to the other. The internal wall of the cylindrical bore 32 is provided with longitudinally extending serrations 33 which form long teeth disposed around the circumference of the bore. The serrations of the bulbous head 29 are enmeshed with the longitudinal serrations 33 so that rotation of the first shaft 31 causes simultaneous rotation of the power-transmitting member 25. By reason of the structure and interfit of the parts, the power-transmitting member 25 may move axially of the first shaft 31, is rotated simultaneously therewith, and may tilt at an angle to the first shaft 31, such as illustrated in FIGURES 4 and 5.

To suspend the power-transmitting member 25 between the first and second shafts and at the same time permit some axial movement of the power-transmitting member 25 relative to the two shafts, a coil spring 35 is mounted within the bore 32 above the bulbous head 29. The bias of the spring 35 is such as to resiliently urge the member 25 downwardly away from the shaft 31. To limit this downward movement of the member 25 and to retain the head 29 within the bore 32, a cross-pin 30 is disposed transversely through the stem portion 28 and out through transverse openings 34 in the wall of the first shaft 31. The oppositely disposed openings 34 are large relative to the diameter of the pin 30 so that the end portions of the pin 30 may move to a considerable but limited degree relative to the edges of the openings 34. For example, as seen in FIGURE 3, the pin 30 is resiliently urged downwardly to engage the bottom edge of the openings 34. In FIGURE 4, the pin 30 is askew to permit limited tilting of the member 25 relative to the axis of the first shaft 31. In FIGURE 5, it is shown that the pin 30 permits tilting of the member 25 in an opposite direction relative to the axis of the shaft 31. Also as seen in FIGURE 7, the pin 30 permits the tilting of the member 25 at an angle to the shaft 31 in a plane at 90° to the plane illustrated in FIGURES 4 and 5.

In the assembly of a sad iron embodying my coupling construction, the member 25 is assembled to the first shaft 31 (with the spring 35 inserted in the bore 32 within the first shaft). This assembly of the first shaft 31 and the member 25 is then inserted up within the handle portion 11 of the sad iron to move the upper end portion of the first shaft 31 into the opening 14 provided therefor. The dial 15 with the spring washer 38 is inserted in the slot 11A into the position illustrated and the first shaft 31 is moved upwardly to firmly interengage with the dial 15. The snap-retaining ring 37 is then put in position around the first shaft 31 so as to lock it at the location illustrated. The shell 12 is secured to the bottom of the handle portion 11 by the bolts 16 leaving access to the member 25 through the opening 12A of the shell 12.

The sole plate 13 has mounted to it the thermostat assembly 18. The second shaft 23 extends upwardly from the assembly 18 in alignment with the pin 21 and spindle 20. In assembling the sole plate with the handle portion 11 and shell 12, the upper end of the second shaft 23 is moved upwardly through opening 12A into the bore 26 so as to enmesh the bulbous head 24 with the serrations 27 in the bore 26. During the assembly, the member 25 may tilt or cock relative to the axis of the first shaft 31 in order to interfit the member 25 with shaft 23. The shell 12 is then secured to the sole plate 13 by the bolt 17. Any misalignment of the axis of the first shaft 31 with the axis of the shaft 23 after the securement of the several parts together is accommodated for by the permissive tilting or cocking of the power-transmitting member 25 and by its telescopic interconnection with the two spaced shafts 31 and 23. The driving rotative force applied to the first shaft 31 by the dial 15 is simultaneously transmitted to the second shaft 23 by the power-transmitting member 25. Thus, the thermostat may be regulated or set by the dial 15 notwithstanding misalignments in the two reference axes and notwithstanding any variation in longitudinal spacing of the dial 15 and thermostat assembly 18. The coupling accommodates itself to the variations in the axial spacing of the parts and to variations in the location of the reference axes relative to each other.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A coupling construction operatively connecting an actuating member rotatable on a first reference axis and an actuable member rotatable on a second reference axis and disposed at an axial distance from the actuating member, and accommodating for any lack of alignment of said reference axes and for any variation in said axial distance, comprising in combination a first shaft engaged to said actuating member to rotate therewith on said first reference axis and extended toward said actuatable member, a second shaft engaged to said actuatable member to rotate therewith on said second reference axis and extended toward said actuating member, a transmitting member telescopically interengaged with said first and second shafts, respectively, for transmitting power between said shafts through a range of variations in said axial distance, and first and second means providing interengagement between said transmitting member and said first shaft and said second shaft, respectively, each of said means including a toothed head and a longitudinal serrated cylindrical inner wall intermeshed to cause rotation of one of the transmitting member and a said shaft upon rotation of the other, said toothed head having longitudinally extending curved sides engageable with said inner wall to permit variable angular disposition of the axes of the transmitting member and a respective shaft interengaged therewith, at least one of said first and second means including a transverse pin movable with said toothed head thereof and a pair of oppositely disposed aligned openings having defining edges movable with said cylindrical inner wall and accommodating opposite end portions of said transverse pin in a loose fit to permit the transverse pin to tilt in a plane coinciding with a common axis through said openings and to be displaced from said plane, said at least one of said first and second means including resilient means biasing said toothed head in a direction outwardly of said cylindrical inner wall and biasing said transverse pin toward a side of said openings in said plane against the defining edges thereof to resiliently resist said tilting in said plane and said displacement from said plane, the arrangement of the said first and second shafts, transmitting member and the said first and second means permitting such angular disposition of the axes of the respective shafts and transmitting member and variable longitudinal positions of the transmitting member along the axes of the shafts, and the arrangement of said transverse pin, openings and resilient means providing for limited resiliently yieldable movement between said at least one of said first and second means.

2. A coupling construction for operatively connecting a rotatable regulator with the turnable portion of a thermostat in an electric appliance notwithstanding any misalignment of the axis of the regulator with the axis of the said turnable portion of the thermostat and any variation in the spacing of the regulator and turnable portion of the thermostat, comprising a first shaft rotatable with the said regulator on the axis thereof, a second shaft rotatable with the turnable portion of the thermostat on the axis thereof, an intermediate member for connecting said shafts for transmitting rotative force of the first shaft to rotative force of the second shaft to turn the turnable portion of the thermostat by said regulator, said intermediate member having its opposite ends in telescopic interengagement with said first and second shafts, respectively, to permit variable axial spacing between said shafts, said intermediate member and said shafts, respectively having intermeshed teeth providing a driving connection therebetween for transmitting rotative force from the first shaft through the intermediate member to said second shaft, said driving connection between said intermediate member and said shafts, respectively, including ball-and-socket structure to permit angular disposition of the axis of the intermediate member to the axes of said first and second axes upon misalignment thereof, said first shaft being uppermost and depending from said rotatable regulator, the lower end of the first shaft having a hollow open end accommodating therein the upper end of said intermediate portion in said telescopic interengagement, a spring in said hollow open end engaging and urging downwardly said intermediate portion relative to said first shaft, a cross-pin carried by said intermediate portion adjacent said upper end, said first shaft having aligned openings accommodating said cross-pin, the diameter of said cross-pin being substantially less than the diameter of said aligned openings, said cross-pin and the edges of said openings engaged by the cross-pin limiting axial and angular movement between said first shaft and intermediate portion.

3. A coupling construction as defined in claim 2 and in which said driving connections are provided by a head having longitudinally extending teeth having an arcuate outer contour and a cylindrical socket telescopically receiving said head and having longitudinally extending teeth disposed on its inner walls parallel to the axis of the cylindrical socket, the arcuate teeth of said head being enmeshed with the longitudinally extending teeth and said cylindrical socket at variable positions of the head along the axis of the cylindrical socket.

References Cited by the Examiner
UNITED STATES PATENTS

| | | | |
|---|---|---|---|
| 890,336 | 6/08 | Coates | 64—2 |
| 1,451,519 | 4/23 | Wilson | 64—8 |
| 1,835,506 | 12/31 | Linn | 64—8 |
| 2,398,579 | 4/46 | Clark et al. | |
| 2,841,966 | 7/58 | Belden et al. | 64—9 |
| 2,909,045 | 10/59 | Burns | 64—9 |

ROBERT C. RIORDON, *Primary Examiner.*